US011256503B2

(12) United States Patent
Chandler et al.

(10) Patent No.: US 11,256,503 B2
(45) Date of Patent: Feb. 22, 2022

(54) COMPUTATIONAL MEMORY

(71) Applicant: UNTETHER AI CORPORATION, Toronto (CA)

(72) Inventors: Trevis Chandler, Dundas (CA); William Martin Snelgrove, Toronto (CA); Darrick John Wiebe, Toronto (CA)

(73) Assignee: UNTETHER AI CORPORATION, Toronto (CA)

( * ) Notice: Subject to any disclaimer, the term of this patent is extended or adjusted under 35 U.S.C. 154(b) by 0 days.

(21) Appl. No.: 16/815,535

(22) Filed: Mar. 11, 2020

(65) Prior Publication Data

US 2020/0293316 A1    Sep. 17, 2020

Related U.S. Application Data

(60) Provisional application No. 62/816,380, filed on Mar. 11, 2019, provisional application No. 62/887,925, (Continued)

(51) Int. Cl.
*G06F 9/30* (2018.01)
*G06F 15/80* (2006.01)

(52) U.S. Cl.
CPC ........ *G06F 9/3001* (2013.01); *G06F 9/30043* (2013.01); *G06F 15/80* (2013.01)

(58) Field of Classification Search
None
See application file for complete search history.

(56) References Cited

U.S. PATENT DOCUMENTS 4,809,347 A    2/1989    Nash et al.
5,038,386 A *  8/1991    Li .................... G06F 15/8023
                                                    382/302
(Continued)

FOREIGN PATENT DOCUMENTS

WO    WO-2014007845 A1    1/2014

OTHER PUBLICATIONS

Beivide, Ramon, et al. "Optimized mesh-connected networks for SIMD and MIMD architectures." Proceedings of the 14th annual international symposium on Computer architecture. 1987.
(Continued)

*Primary Examiner* — Eric Coleman
(74) *Attorney, Agent, or Firm* — Perry + Currier Inc.

(57) ABSTRACT

A processing device includes an array of processing elements, each processing element including an arithmetic logic unit to perform an operation. The processing device further includes interconnections among the array of processing elements to provide direct communication among neighboring processing elements of the array of processing elements. A processing element of the array of processing elements may be connected to a first neighbor processing element that is immediately adjacent the processing element. The processing element may be further connected to a second neighbor processing element that is immediately adjacent the first neighbor processing element. A processing element of the array of processing elements may be connected to a neighbor processing element via an input selector to selectively take output of the neighbor processing element as input to the processing element. A computing device may include such processing devices in an arrangement of banks.

16 Claims, 14 Drawing Sheets

Related U.S. Application Data filed on Aug. 16, 2019, provisional application No. 62/904,142, filed on Sep. 23, 2019, provisional application No. 62/929,233, filed on Nov. 1, 2019, provisional application No. 62/983,076, filed on Feb. 28, 2020.

(56) References Cited

U.S. PATENT DOCUMENTS

| | | | |
|---|---|---|---|
| 5,537,562 A * | 7/1996 | Gallup | G06N 3/063 |
| | | | 712/234 |
| 5,689,661 A * | 11/1997 | Hayashi | G06F 15/17343 |
| | | | 710/316 |
| 5,689,719 A | 11/1997 | Miura et al. | |
| 5,822,608 A | 10/1998 | Dieffemderfer et al. | |
| 5,903,771 A | 5/1999 | Sgro et al. | |
| 5,956,274 A | 9/1999 | Elliott et al. | |
| 6,067,609 A | 5/2000 | Meeker et al. | |
| 6,145,072 A | 11/2000 | Shams et al. | |
| 6,167,501 A * | 12/2000 | Barry | G06F 15/17381 |
| | | | 712/11 |
| 6,279,088 B1 | 8/2001 | Elliott et al. | |
| 6,405,185 B1 | 6/2002 | Pechanek et al. | |
| 6,560,684 B2 | 5/2003 | Elliott et al. | |
| 6,590,419 B1 * | 7/2003 | Betz | H03K 19/17704 |
| | | | 257/499 |
| 6,675,187 B1 * | 1/2004 | Greenberger | G06F 1/02 |
| | | | 708/622 |
| 6,681,316 B1 * | 1/2004 | Clermidy | G06F 11/2025 |
| | | | 712/11 |
| 7,155,581 B2 | 12/2006 | Elliott et al. | |
| 7,418,579 B2 * | 8/2008 | Guibert | G06F 15/7867 |
| | | | 326/38 |
| 8,275,820 B2 * | 9/2012 | Jhang | H04L 27/265 |
| | | | 708/404 |
| 8,443,169 B2 | 5/2013 | Pechanek | |
| 8,769,216 B2 | 7/2014 | Fossum | |
| 8,812,905 B2 * | 8/2014 | Sutardja | G06F 11/2033 |
| | | | 714/10 |
| 10,175,839 B2 | 1/2019 | Srivastava et al. | |
| 10,331,282 B2 | 6/2019 | Srivastava et al. | |
| 10,346,944 B2 | 7/2019 | Nurvitadhi et al. | |
| 10,706,498 B2 | 7/2020 | Nurvitadhi et al. | |
| 2002/0198911 A1 | 12/2002 | Blomgren et al. | |
| 2003/0179631 A1 * | 9/2003 | Koob | H03K 17/693 |
| | | | 365/200 |
| 2004/0103264 A1 * | 5/2004 | Fujii | G06F 15/8007 |
| | | | 712/15 |
| 2007/0033369 A1 * | 2/2007 | Kasama | G06F 15/8007 |
| | | | 711/170 |
| 2013/0103925 A1 | 4/2013 | Meeker | |
| 2017/0148371 A1 * | 5/2017 | Qian | H04N 1/405 |
| 2018/0157970 A1 | 6/2018 | Henry et al. | |
| 2019/0004878 A1 * | 1/2019 | Adler | G06F 9/3005 |
| 2020/0145926 A1 | 5/2020 | Velusamy | |
| 2020/0279349 A1 | 9/2020 | Nurvitadhi et al. | |

OTHER PUBLICATIONS

Serrano, Mauricio J. et al. "Optimal architectures and algorithms for mesh-connected parallel computers with separable row/column buses." IEEE transactions on parallel and distributed systems 4.10 (1993): 1073-1080.

Svensson, B., "SIMD processor array architectures", May 16, 1990, pp. 1-44.

* cited by examiner

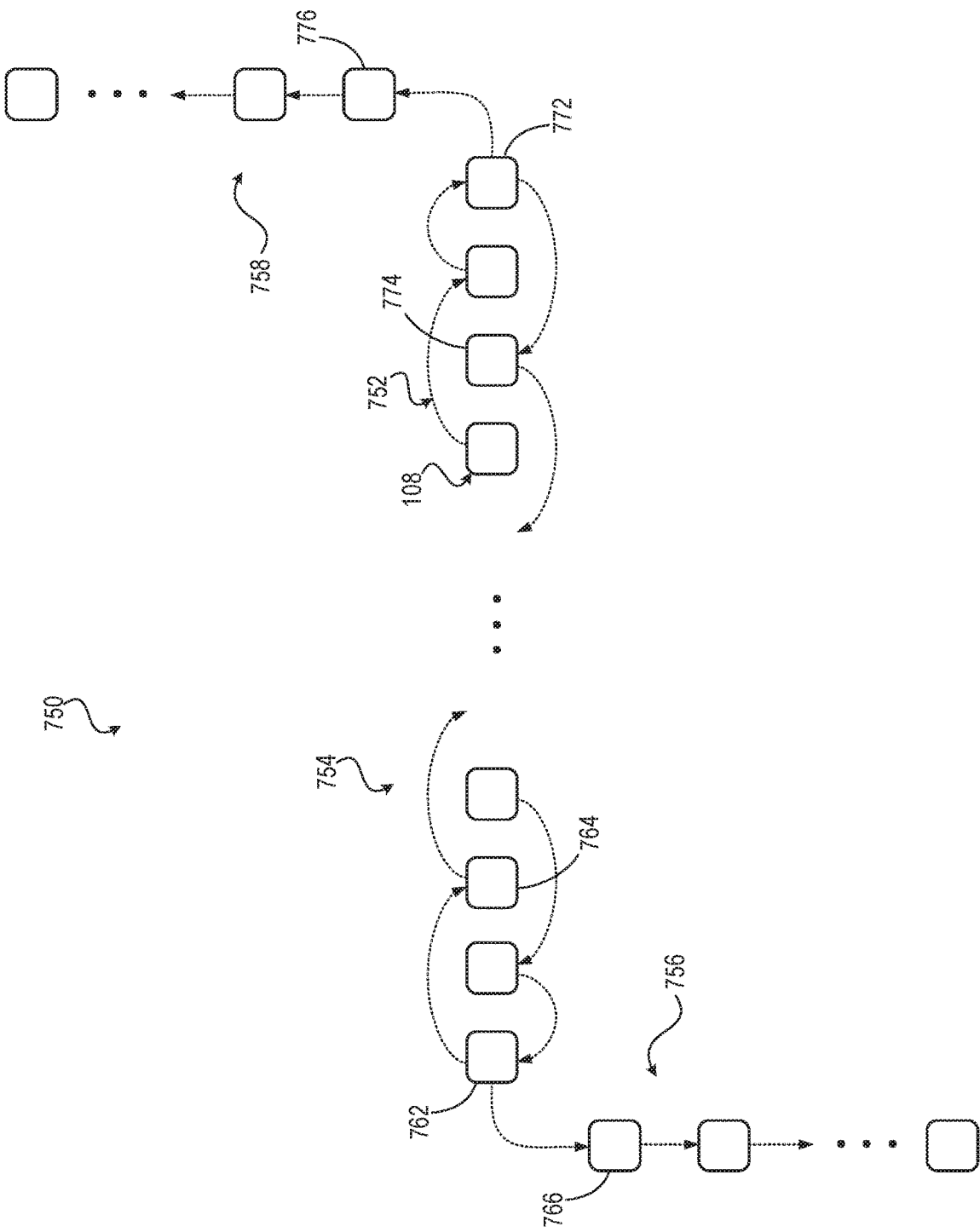

COMPUTATIONAL MEMORY

CROSS-REFERENCE TO RELATED APPLICATIONS

This application claims priority to U.S. provisional patent application serial nos. 62/816,380 (filed Mar. 11, 2019), 62/887,925 (filed Aug. 16, 2019), 62/904,142 (filed Sep. 23, 2019), 62/929,233 (filed Nov. 1, 2019), and 62/983,076 (filed Feb. 28, 2020), all of which are incorporated herein by reference.

BACKGROUND

Deep learning has proven to be a powerful technique for performing functions that have long resisted other artificial intelligence approaches. For example, deep learning may be applied to recognition of objects in cluttered images, speech understanding and translation, medical diagnosis, gaming, and robotics. Deep learning techniques typically apply many layers (hence "deep") of neural networks that are trained (hence "learning") on the tasks of interest. Once trained, a neural network may perform "inference", that is, inferring from new input data an output consistent with what it has learned.

Neural networks, which may also be called neural nets, perform computations analogous to the operations of biological neurons, typically computing weighted sums (or dot products) and modifying the results with a memoryless nonlinearity. However, it is often the case that more general functionality, such as memory, multiplicative nonlinearities, and "pooling", are also required.

In many types of computer architecture, power consumption due to physically moving data between memory and processing elements is non-trivial and is frequently the dominant use of power. This power consumption is typically due to the energy required to charge and discharge the capacitance of wiring, which is roughly proportional to the length of the wiring and hence to distance between memory and processing elements. As such, processing a large number of computations in such architectures, as generally required for deep learning and neural networks, often requires a relatively large amount of power. In architectures that are better suited to handle deep learning and neural networks, other inefficiencies may arise, such as increased complexity, increased processing time, and larger chip area requirements.

SUMMARY

According to an aspect of this disclosure, a processing device includes an array of processing elements, each processing element including an arithmetic logic unit to perform an operation. The processing device further includes interconnections among the array of processing elements to provide direct communication among neighboring processing elements of the array of processing elements. A processing element of the array of processing elements is connected to a first neighbor processing element that is immediately adjacent the processing element. The processing element is further connected to a second neighbor processing element that is immediately adjacent the first neighbor processing element.

According to another aspect of this disclosure, a computing device includes a plurality of such processing devices as an arrangement of banks.

According to another aspect of this disclosure, a non-transitory machine-readable medium includes executable instructions to load a matrix of coefficients into an array of processing elements as serialized coefficients, load an input vector into the linear array of processing elements, perform an operation with the matrix of coefficients and the input vector by: performing a parallel operation with the serialized coefficients in the linear array of processing elements and the input vector, accumulating a result vector, rotating the input vector in the linear array of processing elements and repeating the performing of the parallel operation and the accumulating until the operation is complete. When the operation is complete, the instructions output the result vector.

According to another aspect of this disclosure, a processing device includes an array of processing elements, each processing element including an arithmetic logic unit to perform an operation. The processing device further includes interconnections among the array of processing elements to provide direct communication among neighboring processing elements of the array of processing elements. A processing element of the array of processing elements is connected to a neighbor processing element via an input selector to selectively take output of the neighbor processing element as input to the processing element.

BRIEF DESCRIPTION OF THE DRAWINGS

FIG. 7D is a schematic diagram of an example interconnected set of processing elements to facilitate movement of data, particularly for computations involving non-square matrices.

DETAILED DESCRIPTION

The techniques described herein aim to improve computational memory to handle large numbers of dot-product and neural-network computations with flexible low-precision arithmetic, provide power-efficient communications, and provide local storage and decoding of instructions and coefficients. The parallel processing described herein is suitable for neural networks, particularly where power consumption is a concern, such as in battery-powered devices, portable computers, smartphones, wearable computers, smart watches, and the like.

Figure 1:
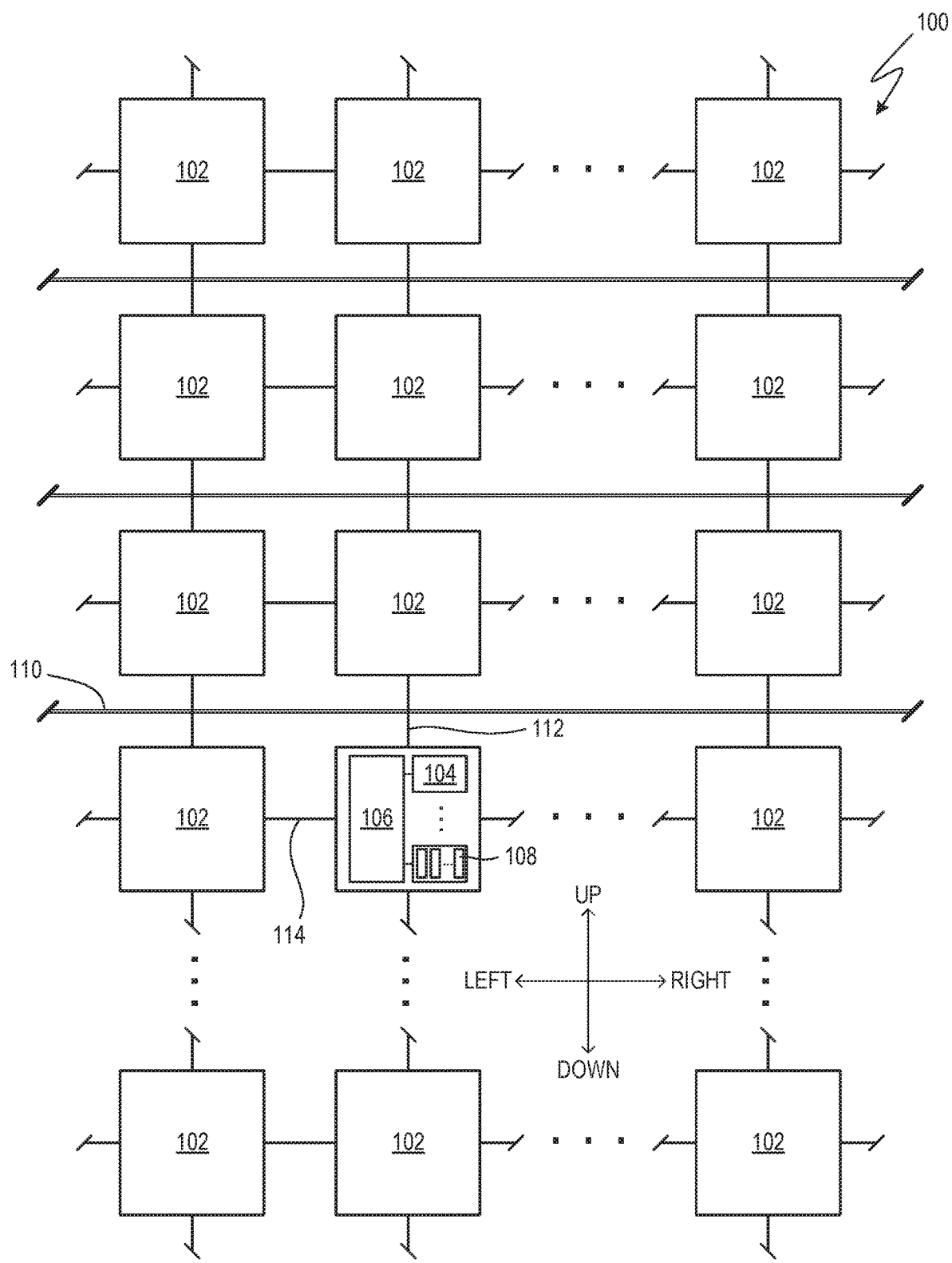
FIG. 1 is a block diagram of an example computing device that includes banks of processing elements.

FIG. 1 shows a computing device 100. The computing device 100 includes a plurality of banks 102 of processing elements. The banks 102 may be operated in a cooperative manner to implement a parallel processing scheme, such as a SIMD scheme. A bank 102 may be considered a processing device.

The banks 102 may be arranged in a regular rectangular grid-like pattern, as illustrated. For sake of explanation, relative directions mentioned herein will be referred to as up, down, vertical, left, right, horizontal, and so on. However, it is understood that such directions are approximations, are not based on any particular reference direction, and are not to be considered limiting.

Any practical number of banks 102 may be used. Limitations in semiconductor fabrication techniques may govern. In some examples, 512 banks 102 are arranged in a 32-by-16 grid.

A bank 102 may include a plurality of rows 104 of processing elements (PEs) 108 and a controller 106. A bank 102 may include any practical number of PE rows 104. For example, eight rows 104 may be provided for each controller 106. In some examples, all banks 102 may be provided with the same or similar arrangement of rows. In other examples, substantially all banks 102 are substantially identical. In still other examples, a bank 102 may be assigned a special purpose in the computing device and may have a different architecture, which may omit PE rows 104 and/or a controller 106.

Any practical number of PEs 108 may be provided to a row 104. For example, 256 PEs may be provided to each row 104. Continuing the numerical example above, 256 PEs provided to each of eight rows 104 of 512 banks 102 means the computing device 100 includes about 1.05 million PEs 108, less any losses due to imperfect semiconductor manufacturing yield.

A PE 108 may be configured to operate at any practical bit size, such as one, two, four, or eight bits. PEs may be operated in pairs to accommodate operations requiring wider bit sizes.

Instructions and/or data may be communicated to/from the banks 102 via an input/output (I/O) bus 110. The I/O bus 110 may include a plurality of segments.

A bank 102 may be connected to the I/O bus 110 by a vertical bus 112. Additionally or alternatively, a vertical bus 112 may allow communication among banks 102 in a vertical direction. Such communication may be restricted to immediately vertically adjacent banks 102 or may extend to further banks 102.

A bank 102 may be connected to a horizontally neighboring bank 102 by a horizontal bus 114 to allow communication among banks 102 in a horizontal direction. Such communication may be restricted to immediately horizontally adjacent banks 102 or may extend to further banks 102.

Communications through any or all of the buses 110, 112, 114 may include direct memory access (DMA) to memory of the rows 104 of the PEs 108. Additionally or alternatively, such communications may include memory access performed through the processing functionality of the PEs 108.

The computing device 100 may include a main processor (not shown) to communicate instructions and/or data with the banks 102 via the I/O bus 110, manage operations of the banks 102, and/or provide an I/O interface for a user, network, or other device. The I/O bus 110 may include a Peripheral Component Interconnect Express (PCIe) interface or similar.

Figure 2:
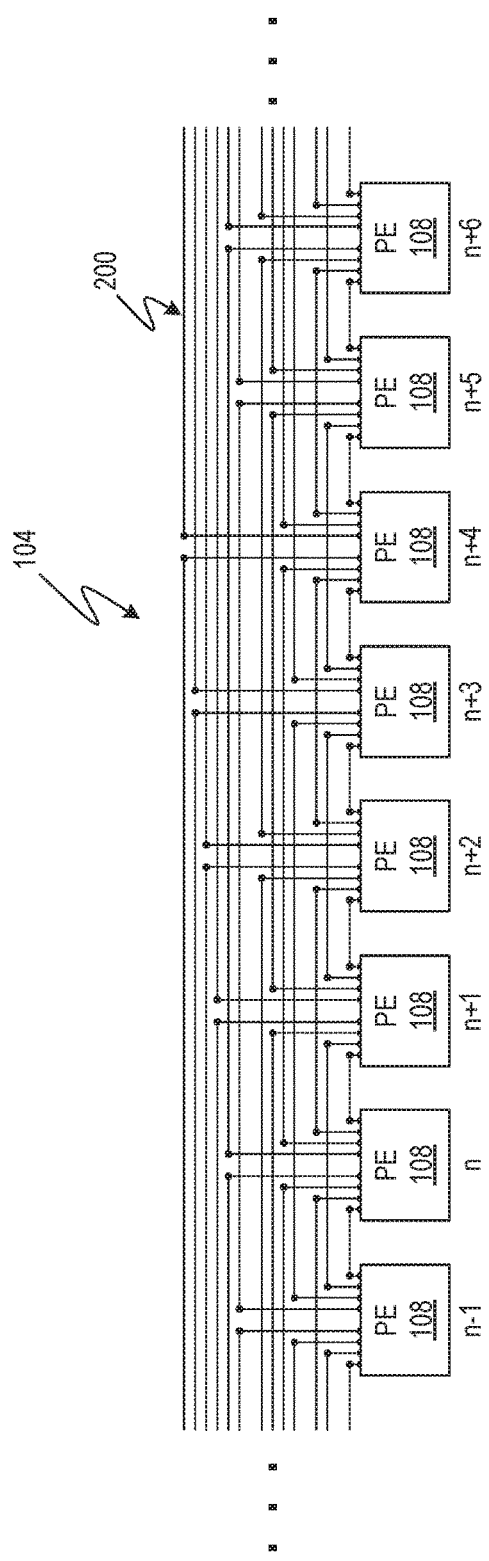
FIG. 2 is a block diagram of an example array of processing elements.

FIG. 2 shows an example row 104 including an array of processing elements 108, which may be physically arranged in a linear pattern (e.g., a physical row). Each PE 108 includes an arithmetic logic unit (ALU) to perform an operation, such as addition, multiplication, and so on.

The PEs 108 are mutually connected to share or communicate data. For example, interconnections 200 may be provided among the array of PEs 108 to provide direct communication among neighboring PEs 108.

A PE 108 (e.g., indicated at "n") is connected to a first neighbor PE 108 (i.e., n+1) that is immediately adjacent the PE 108. Likewise, the PE 108 (n) is further connected to a second neighbor PE 108 (n+2) that is immediately adjacent the first neighbor PE 108 (n+1). A plurality of PEs 108 may be connected to neighboring processing elements in the same relative manner, where n merely indicates an example PE 108 for explanatory purposes. That is, the first neighbor PE 108 (n+1) may be connected to its respective first and second neighbors (n+2 and n+3).

A given PE 108 (e.g., n+5) may also be connected to an opposite first neighbor PE 108 (n+4) that is immediately adjacent the PE 108 (n+5) on a side opposite the first neighbor PE 108 (n+6). Similarly, the PE 108 (n+5) may further be connected to an opposite second neighbor PE 108 (n+3) that is immediately adjacent the opposite first neighbor PE 108 (n+4).

Further, a PE 108 may be connected to a fourth neighbor PE 108 that is immediately adjacent a third neighbor PE 108 that is immediately adjacent the second neighbor PE 108. For example, the PE 108 designated at n may be connected to the PE designated at n+4. A connection of the PE 108 (n) to its third neighbor PE 108 (n+3) may be omitted. The fourth-neighbor connection may also be provided in the opposite direction, so that the PE 108 (n) connects to its fourth neighbor PE 108 at n−4 (not shown).

Still further, a PE 108 may be connected to a sixth neighbor PE 108 that is immediately adjacent a fifth neighbor PE 108 that is immediately adjacent the fourth neighbor PE 108. For example, the PE 108 designated at n may be connected to the PE designated at n+6. A connection of the PE 108 (n) to its fifth neighbor PE 108 (n+5) may be omitted. The sixth-neighbor connection may also be provided in the opposite direction, so that the PE 108 (n) connects to its sixth neighbor PE 108 at n−6 (not shown).

Again, a plurality of PEs 108 may be connected to neighboring processing elements in the above relative manner. The designation of a PE 108 as n may be considered arbitrary for non-endmost PEs 108. PEs 108 at the ends of the array may omit certain connections by virtue of the array terminating. In the example of each PE 108 being connected to its first, second, fourth, and sixth neighbor PEs 108 in both directions, the six endmost PEs 108 have differing connections.

Figure 3:
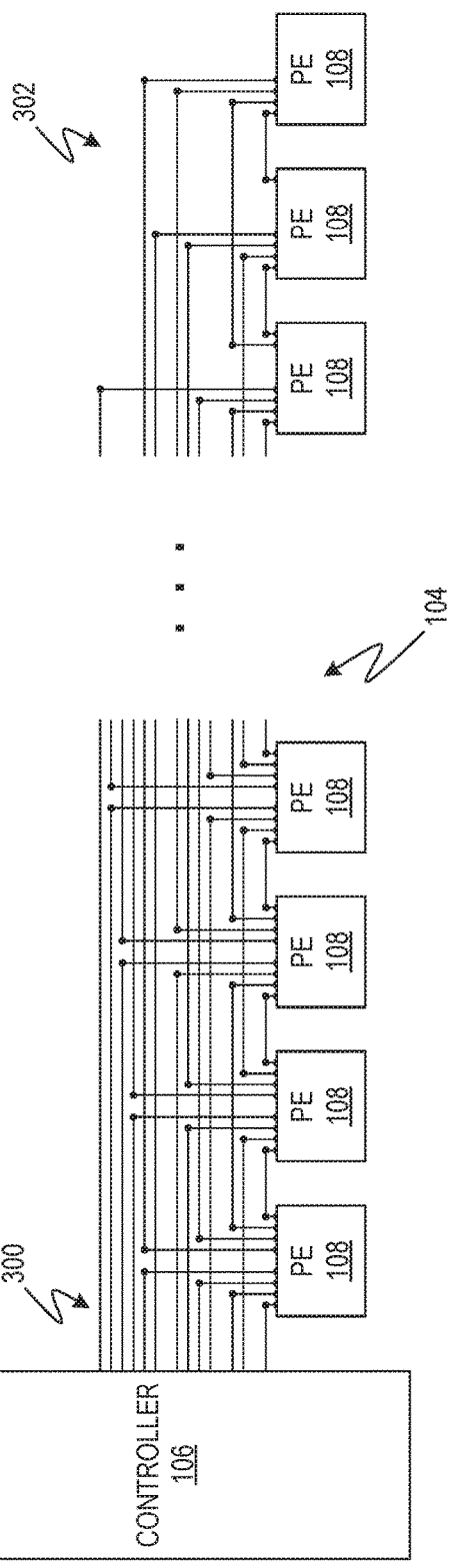
FIG. 3 is a block diagram of an example array of processing elements with a controller.

With reference to FIG. 3, endmost PEs 108 at one end of a row 104 may have connections 300 to a controller 106. Further, endmost PEs 108 at the opposite end of the row 104 may have a reduced number of connections 302. Additionally or alternatively, end-most PEs 108 of one bank 102 may connect in the same relative manner through the controller 106 and to PEs 108 of an adjacent bank 102. That is, the controller 106 may be connected between two rows 104 of PEs 108 in adjacent banks 102, where the two rows 104 of PEs 108 are connected in the same manner as shown in FIG. 2.

Figure 4:
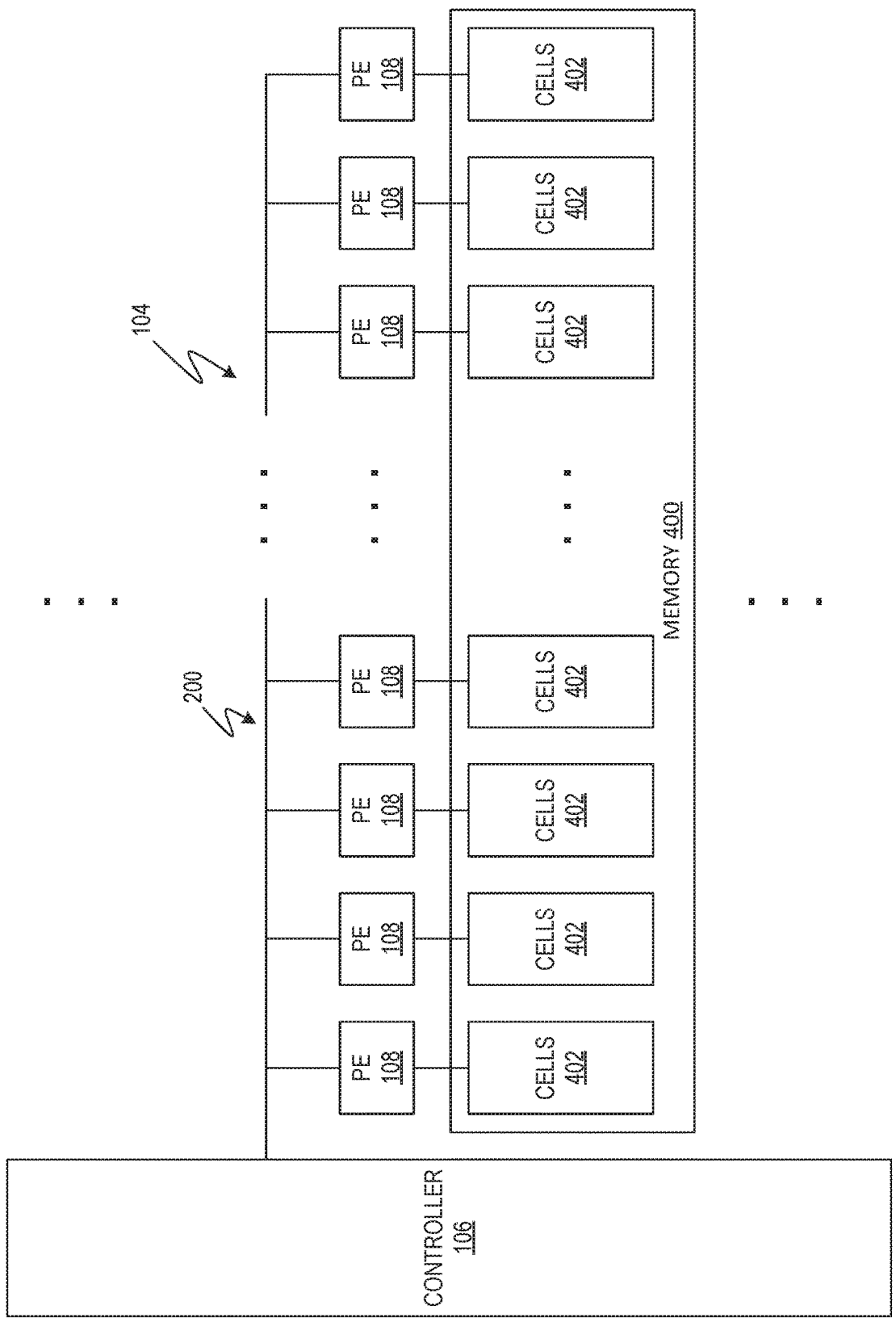
FIG. 4 is a block diagram of an example array of processing elements with a controller and memory.

With reference to FIG. 4, a row 104 of PEs 108 may include memory 400 to store data for the row 104. A PE 108 may have a dedicated space in the memory 400. For example, each PE 108 may be connected to a different range of memory cells 402. Any practical number of memory cells 402 may be used. In one example, 144 memory cells 402 are provided to each PE 108. Note that in FIG. 4 the interconnections 200 among the PEs 108 and with the controller 106 are shown schematically for sake of explanation.

The controller 106 may control the array of PEs 108 to perform a SIMD operation with data in the memory 400. For example, the controller 106 may trigger the PEs 108 to simultaneously add two numbers stored in respective cells 402.

The controller 106 may communicate data to and from the memory 400 though the PEs 108. For example, the controller 106 may load data into the memory 400 by directly loading data into connected PEs 108 and controlling PEs 108 to shift the data to PEs 108 further in the array. PEs 108 may load such data into their respective memory cells 402. For example, data destined for rightmost PEs 108 may first be loaded into leftmost PEs and then communicated rightwards by interconnections 200 before being stored in rightmost memory cells 402. Other methods of I/O with the memory, such as direct memory access by the controller 106, are also contemplated. The memory cells 402 of different PEs 108 may have the same addresses, so that address decoding may be avoided to the extent possible. In addition, the PEs 108 may be configured to receive broadcasts of data from the controller 106.

Data stored in memory cells 402 may be any suitable data, such as operands, operators, coefficients, vector components, mask data, selection data, and similar. Mask data may be used to select portions of a vector. Selection data may be used to make/break connections among neighboring PEs 108.

Further, the controller 106 may perform a rearrangement of data within the array of PEs 108 by controlling communication of data through the interconnections 200 among the array of PEs 108. A rearrangement of data may include a rotation or cycling that reduces or minimizes a number of memory accesses while increasing or maximizing operational throughput. Other examples of rearrangements of data include reversing, interleaving, and duplicating.

In other examples, a set of interconnections 200 may be provided to connect PEs 108 in up-down (column-based) connections, so that information may be shared directly between PEs 108 that are in adjacent rows. In this description, interconnections 200 and related components that are discussed with regard to left-right (row-based) connections among PEs apply in principle to up-down (column-based) connections among PEs.

The controller 106 may be configured to perform computations with data at the PEs 108, such as summations, determinations of maximums, softmax, and similar functions that are useful in implementing neural networks. For example, controller 106 may be configured to perform a computation using the content of a register in each PE 108 of a group or bank of PEs.

Various example applications may reference pixel information of digital images to, for example, perform image classification.

In another example, pooling is performed, in which a maximum or average of adjacent values is computed. Adjacent values may be adjacent in the sense of image pixels, in that a region of pixels of an image undergoes pooling.

Figures 5, 6:
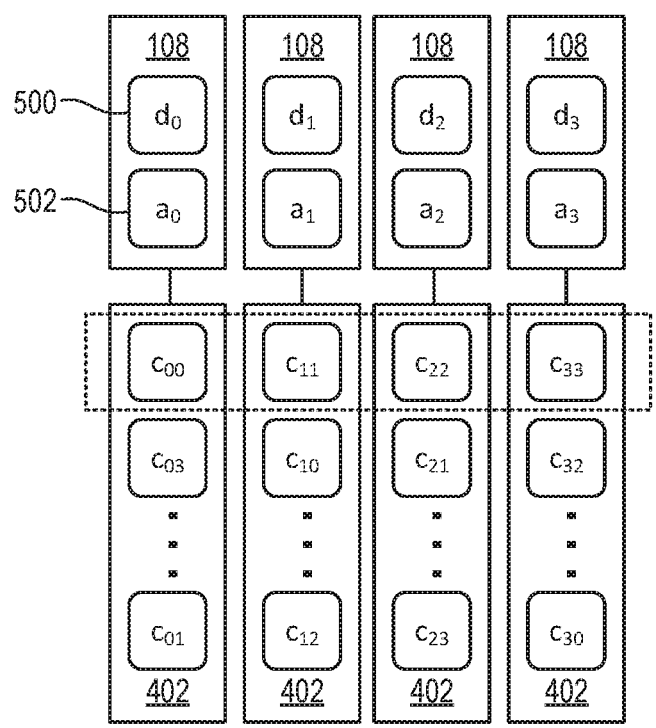
FIG. 5 is a schematic diagram of example processing elements and related memory cells.
FIG. 6 is an equation for an example matrix multiplication carried out by the processing elements and memory cells of FIG. 5.

FIG. 5 shows an array of PEs 108 and related memory cells 402. Each PE 108 may include local registers 500, 502 to hold data undergoing an operation. Memory cells 402 may also hold data contributing to the operation. For example, the PEs 108 may carry out a matrix multiplication, as shown in FIG. 6.

A matrix multiplication may be a generalized matrix-vector multiply (GEMV). A matrix multiplication may use a coefficient matrix and an input vector to obtain a resultant vector. In this example, the coefficient matrix is a four-by-four matrix and the vectors are of length four. In other examples, matrices and vectors of any practical size may be used. In other examples, a matrix multiplication may be a generalized matrix-matrix multiply (GEMM).

As matrix multiplication involves sums of products, the PEs 108 may additively accumulate resultant vector components $d_0$ to $d_3$ in respective registers 500, while input vector components $a_0$ to $a_3$ are multiplied by respective coefficients $c_{00}$ to $c_{33}$. That is, one PE 108 may accumulate a resultant vector component $d_0$, a neighbor PE 108 may accumulate another resultant vector component $d_1$, and so on. Resultant vector components $d_0$ to $d_3$ may be considered dot products. Generally, a GEMV may be considered a collection of dot products of a vector with a set of vectors represented by the rows of a matrix.

To facilitate matrix multiplication, the contents of registers 500 and/or registers 502 may be rearranged among the PEs 108. A rearrangement of resultant vector components $d_0$ to $d_3$ and/or input vector components $a_0$ to $a_3$ may use the direct interconnections among neighbor PEs 108, as discussed above. In this example, resultant vector components $d_0$ to $d_3$ remain fixed and input vector components $a_0$ to $a_3$ are moved. Further, coefficients $c_{00}$ to $c_{33}$ may be loaded into memory cells to optimize memory accesses.

In the example illustrated in FIG. 5, the input vector components $a_0$ to $a_3$ are loaded into a sequence of PEs 108 that are to accumulate resultant vector components $d_0$ to $d_3$ in the same sequence. The relevant coefficients $c_{00}$, $c_{11}$, $c_{22}$, $c_{33}$ are accessed and multiplied by the respective input vector components $a_0$ to $a_3$. That is, $a_0$ and $c_{00}$ are multiplied and then accumulated as $d_0$, $a_1$ and $c_{11}$ are multiplied and then accumulated as $d_1$, and so on.

Figure 7A:
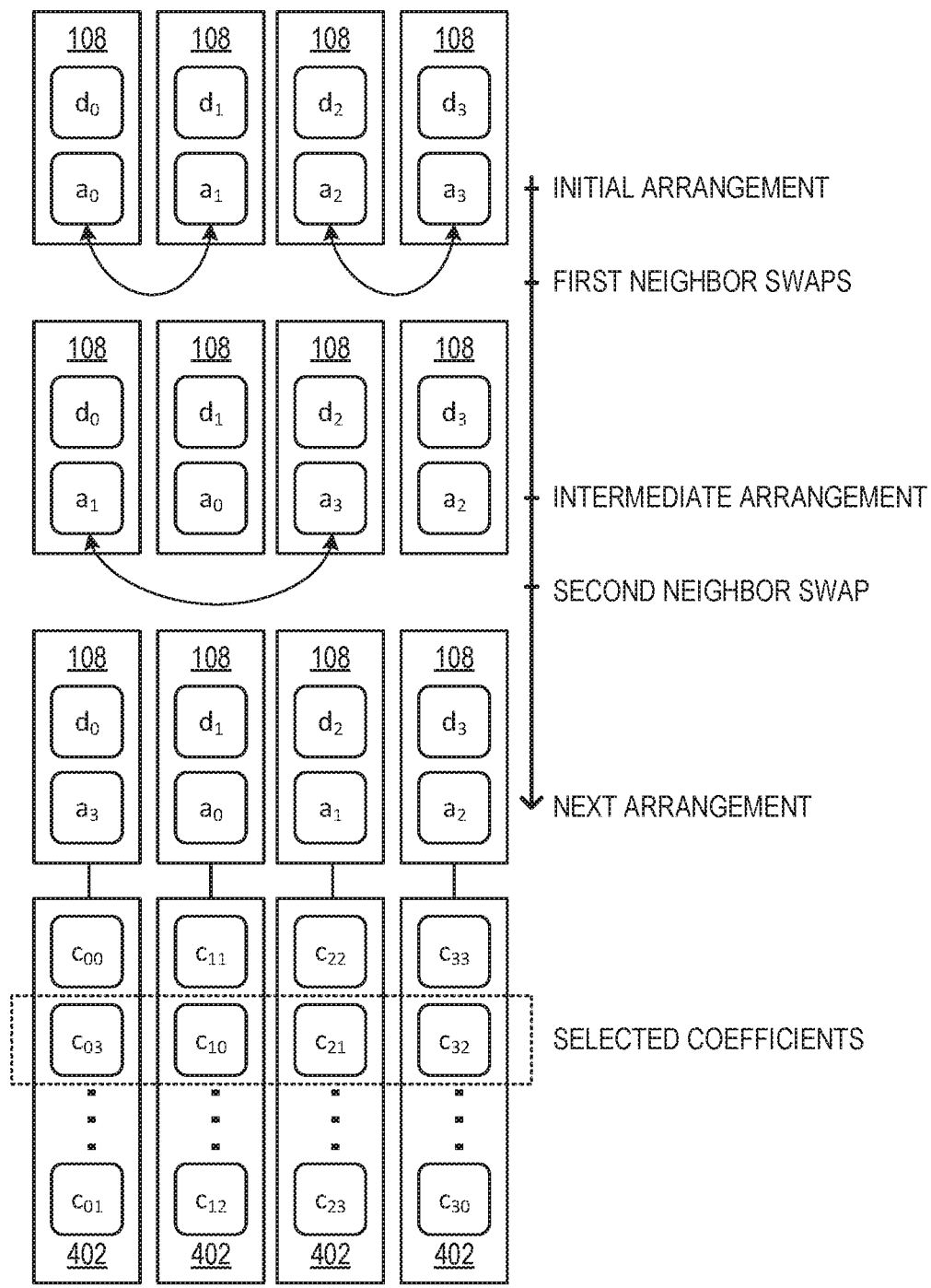
FIG. 7A is a schematic diagram of an example state sequence of the processing elements and memory cells of FIG. 5.

The input vector components $a_0$ to $a_3$ are then rearranged, as shown in the PE state sequence of FIG. 7A, so that a remaining contribution of each input vector components $a_0$ to $a_3$ to a respective resultant vector components $d_0$ to $d_3$ may be accumulated. In this example, input vector components $a_0$ to $a_2$ are moved one PE 108 to the right and input vector components $a_3$ is moved three PEs 108 to the left. With reference to the first and second neighbor connections shown in FIG. 2, this rearrangement of input vector components $a_0$ to $a_3$ may be accomplished by swapping $a_0$ with $a_1$ and simultaneously swapping $a_2$ with $a_3$, using first neighbor connections, and then by swapping $a_1$ with $a_3$ using second neighbor connections. The result is that a next arrangement of input vector components $a_3$, $a_0$, $a_1$, $a_2$ at the PEs 108 is achieved, where each input vector component is located at a PE 108 that it has not yet occupied during the present matrix multiplication.

Appropriate coefficients $c_{03}$, $c_{10}$, $c_{21}$, $c_{32}$ in memory cells 402 are then accessed and multiplied by the respective input vector components $a_3$, $a_0$, $a_1$, $a_2$. That is, $a_3$ and $c_{03}$ are multiplied and then accumulated as $d_0$, $a_0$ and $c_{10}$ are multiplied and then accumulated as $d_1$, and so on.

The input vector components $a_0$ to $a_3$ are then rearranged twice more, with multiplying accumulation being performed with the input vector components and appropriate coefficients at each new arrangement. At the conclusion of four sets of multiplying accumulation and three intervening rearrangements, the accumulated resultant vector components $d_0$ to $d_3$ represent the final result of the matrix multiplication.

Rearrangement of the input vector components $a_0$ to $a_3$ allows each input vector component to be used to the extent needed when it is located at a particular PE 108. This is different from traditional matrix multiplication where each resultant vector component is computed to finality prior to moving to the next. The present technique simultaneously accumulates all resultant vector components using sequenced arrangements of input vector components.

Further, such rearrangements of data at the PEs 108 using the PE neighbor interconnections (FIG. 2) may be optimized to reduce or minimize processing cost. The example given above of two simultaneous first neighbor swaps followed by a second neighbor swap is merely one example. Additional examples are contemplated for matrices and vectors of various dimensions.

Further, the arrangements of coefficients $c_{00}$ to $c_{33}$ in the memory cells 402 may be predetermined, so that each PE 108 may access the next coefficient needed without requiring coefficients to be moved among memory cells 402. The coefficients $c_{00}$ to $c_{33}$ may be arranged in the memory cells 402 in a diagonalized manner, such that a first row of coefficients is used for a first arrangement of input vector components, a second row of coefficients is used for a second arrangement of input vector components, and so on. Hence, the respective memory addresses referenced by the PEs 108 after a rearrangement of input vector components may be incremented or decremented identically. For example, with a first arrangement of input vector components, each PE 108 may reference its respective memory cell at address 0 for the appropriate coefficient. Likewise, with a second arrangement of input vector components, each PE 108 may reference its respective memory cell at address 1 for the appropriate coefficient, and so on.

Figure 7B:
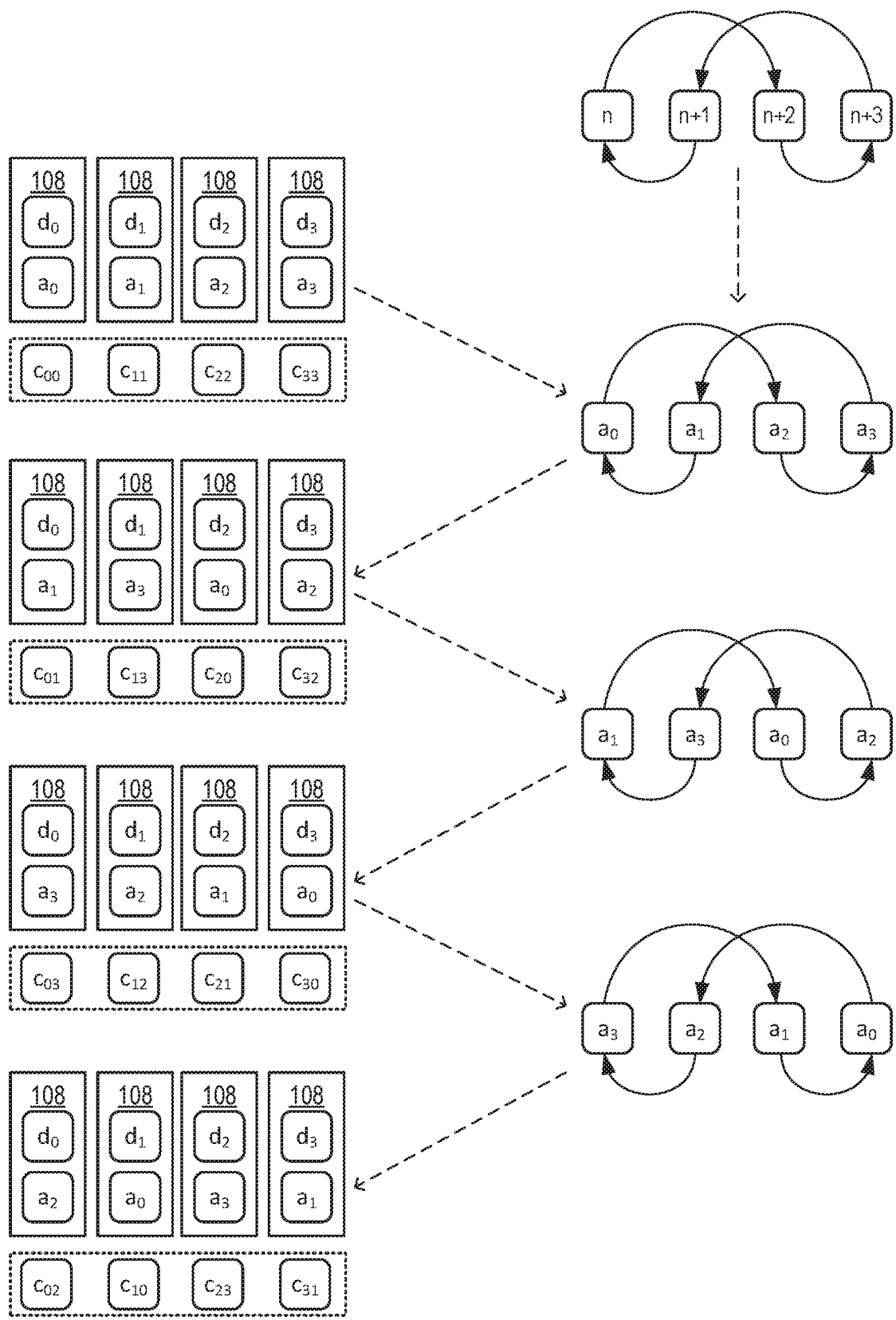
FIG. 7B is a schematic diagram of an example state sequence of the processing elements and memory cells of FIG. 5.

FIG. 7B shows another example sequence. Four states of a set of PEs 108 are shown with four sets of selected coefficients. Input vector components $a_0$ to $a_3$ are rotated so that each component $a_0$ to $a_3$ is used exactly once to contribute to the accumulation at each resultant vector component $d_0$ to $d_3$. The coefficients $c_{00}$ to $c_{33}$ are arranged so that the appropriate coefficient $c_{00}$ to $c_{33}$ is selected for each combination of input vector component $a_0$ to $a_3$ and resultant vector component $d_0$ to $d_3$. In this example, the input vector components $a_0$ to $a_3$ are subject to the same rearrangement three times to complete a full rotation. Specifically, the input vector component of an $n^{th}$ PE 108 is moved right to the second neighbor PE 108 (i.e., n+2), the input vector component of the PE 108 n+1 is moved left (opposite) to its first neighbor PE 108 (i.e., n) in that direction, the input vector component of the PE 108 n+2 is moved right to the first neighbor PE 108 (i.e., n+3), and the input vector component of the PE 108 n+3 is moved left to the second neighbor PE 108 (i.e., n+1).

Figure 7C:
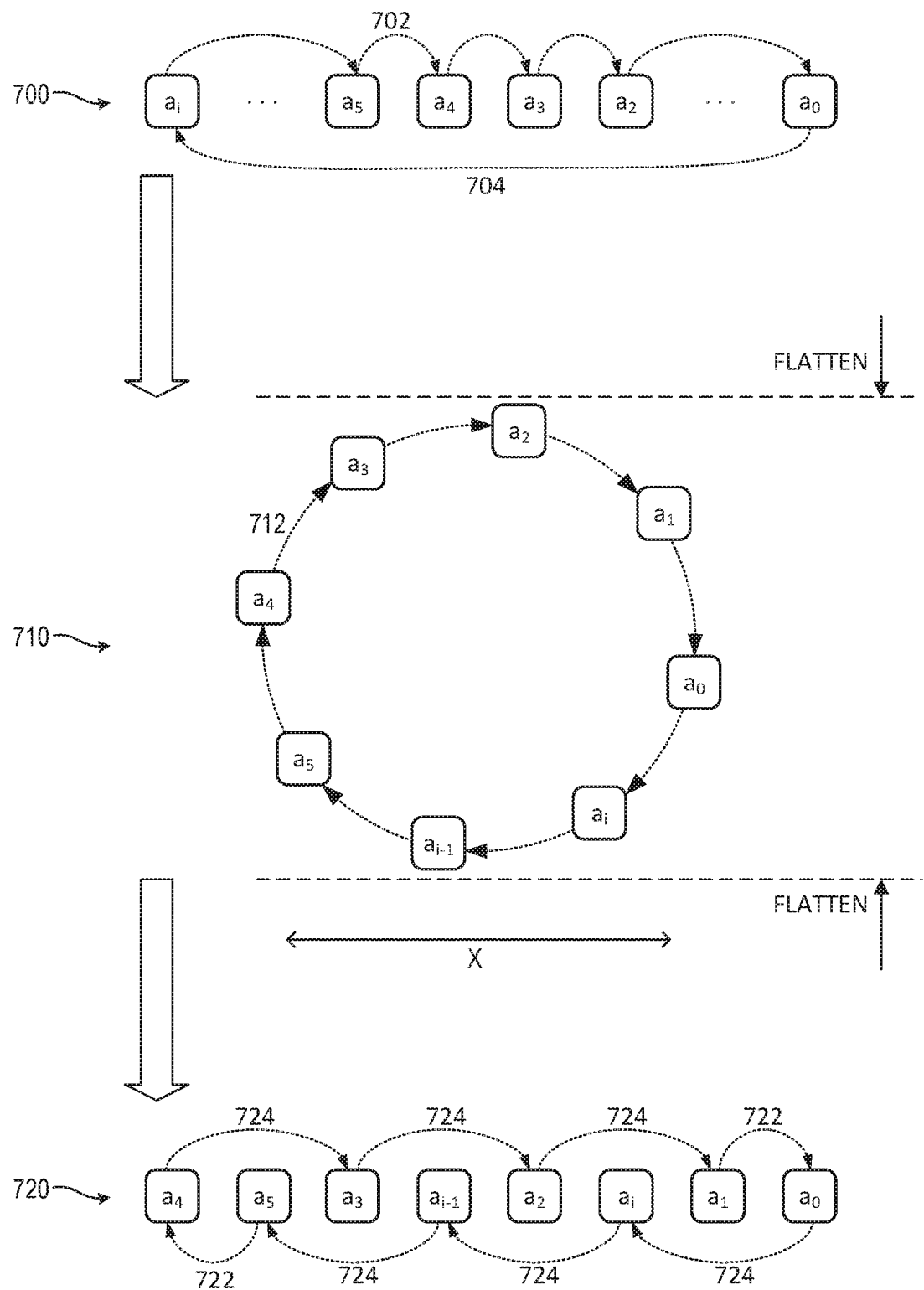
FIG. 7C is a schematic diagram of an example generalized solution to movement of input vector components among a set of processing elements.

FIG. 7C shows a generalized solution, which is implicit from the examples discussed herein, to movement of input vector components among a set of PEs 108. As shown by the row-like arrangement 700 of input vector components $a_0$ to $a_1$, which may be held by a row 104 of PEs 108, rotating information may require many short paths 702, between adjacent components $a_0$ to $a_1$, and a long path 704 between end-most components $a_i$ and $a_0$. The short paths are not a concern. However, the long path 704 may increase latency and consume additional electrical power because charging and charging a conductive trace takes time and is not lossless. The longer the trace, the greater the time/loss. The efficiency of a row 104 of PEs 108 is limited by its long path 704, in that power is lost and other PEs 108 may need to wait while data is communicated over the long path 704.

As shown at 710, a circular arrangement of PEs 108 may avoid a long path 704. All paths 712 may be segments of a circle and may be made the same length. A circular arrangement 710 of PEs 108 may be considered an ideal case. However, a circular arrangement 710 is impractical for manufacturing purposes.

Accordingly, the circular arrangement 720 may be rotated slightly and flattened (or squashed), while preserving the connections afforded by circular segment paths 712 and the relative horizontal (X) positions of the PEs, to provide for an efficient arrangement 720, in which paths 722, 724 connect adjacent PEs or skip one intermediate PE. As such, PEs 108 may be connected by a set of first-neighbor paths 722 (e.g., two end-arriving paths) and a set of second neighbor paths 724 (e.g., four intermediate and two end-leaving paths) that are analogous to circular segment paths 712 of a circular arrangement 710. The paths 722, 724 have much lower variance than the short and long paths 702, 704, so power may be saved and latency reduced. Hence, the arrangement 720 represents a readily manufacturable implementation of an ideal circular arrangement of PEs 108.

FIG. 7D shows an example interconnected set 750 of PEs 108, which is implicit from the examples discussed herein, to facilitate movement of data among PEs 108, so that a computation may be performed efficiently. The interconnected set 750 of PEs 108 is created by activating interconnections among PEs 108, as discussed elsewhere herein. Data may thus be communicated, via PE-to-PE connections 752, in the direction of the dashed arrows shown.

The interconnected set 750 of PEs 108 includes a flattened loop 754 and at least one tail 756, 758, with two being an example.

The flattened loop 754 is similar to the arrangement 720 discussed above. A first-end PE 762 can provide data to both the next PE 764 in the flattened loop 754 and a first PE 766 of the first tail 756. Similarly, a second-end PE 772 can provide data to both its next PE 774 in the flattened loop 754 and a first PE 776 of the second tail 758. The multiple outputs of the loop-end PEs 762, 772 may be facilitated by the listening functionality discussed elsewhere herein. That is, the loop PE 764 and tail PE 766 may listen to the same first-end PE 762, and the other loop PE 774 and other tail PE 776 may listen to the same second-end PE 772.

The tail 756, 758 is formed by connecting PEs 108 in a sequence that does not loop.

The interconnected set 750 of PEs 108 may be useful for computations with non-square matrices. A tail 756, 758 can be used to accommodate residual elements of data when a number of results and a number of inputs of a matrix are not the same or are a simple multiple or fraction.

For example, a matrix with 51 inputs (e.g., activations, input vector components, or "a") and 64 outputs (resultant vector components or "d") can be handled by setting PE 108 interconnections to create a flattened loop 754 of 51 PEs and a tail 756, 758 of 13 PEs (64−51=13). When the tail 756, 758 is filled with the correct activations, a matrix multiplication can be performed with a GEMV of 51. Each PE 108 will see each of the 51 activations. A tail of 13 PEs 108 can be split into two tails 756, 758 that total to 13 PEs, such as a first tail 756 of 7 PEs 108 and a second tail 758 of 6 PEs 108. To fill the tails 756, 758, a number of rotations equal to the length of the longest tail 756 is performed before GEMV is started. As such, computations involving non-square matrices may be performed efficiently.

Figure 8:
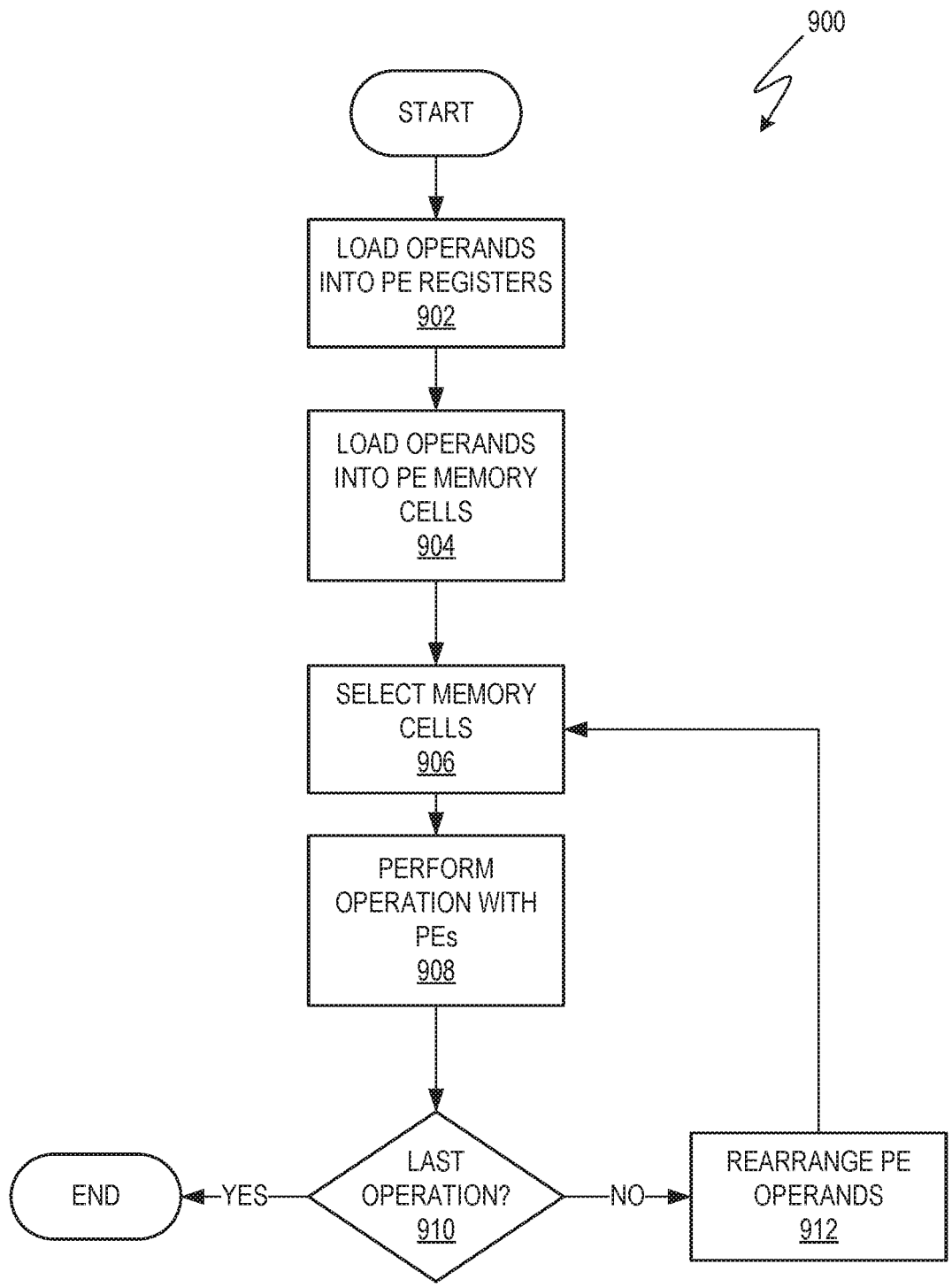
FIG. 8 is a flowchart of an example method of performing operations using processing elements and memory cells.

FIG. 8 shows a method 900 that generalizes the above example. The method 900 may be performed with the computing device 100 or a similar device. The method may be implemented by a non-transitory machine-readable medium, such as random-access memory (RAM) or electrically erasable programmable read-only memory (EEPROM), that includes executable instructions.

At block 902, operands (e.g., matrix coefficients) are loaded into PE memory cells. The arrangement of operands may be predetermined with the constraint that moving operands is to be avoided where practical. An operand may be duplicated at several cells to avoid moving an operand between such cells.

At block 904, operands (e.g., input vector components) are loaded into PE registers. The operands to be loaded into PE registers may be distinguished from the operands to be loaded into PE memory cells, in that there may be fewer PE registers than PE memory cells. Hence, in the example of a matrix multiplication, it may be more efficient to load the smaller matrix/vector to the into PE registers and load the larger matrix into the PE memory cells. In other applications, other preferences may apply.

At block 906, a set of memory cells may be selected for use in an operation. The set may be a row of memory cells. For example, a subset of coefficients of a matrix to be multiplied may be selected, one coefficient per PE.

At block 908, the same operation is performed by the PEs on the contents of the selected memory cells and respective PE registers. The operation may be performed substantially simultaneously with all relevant PEs. All relevant PEs may be all PEs of a device or a subset of PEs assigned to perform the operation. An example operation is a multiplication (e.g., multiplying PE register content with memory cell content) and accumulation (e.g., accumulating the resulting product with a running total from a previous operation).

Then, if a subsequent operation is to be performed, via block 910, operands in the PE registers may be rearranged, at block 912, to obtain a next arrangement. A next set of memory cells is then selected at block 906, and a next operation is performed at block 908. For example, a sequence of memory cells may be selected during each cycle and operands in the PE registers may be rearranged to correspond to the sequence of memory cells, so as to perform a matrix multiplication. In other examples, other operations may be performed.

Hence, a sequence or cycle or operations may be performed on the content of selected memory cells using the content of PE registers that may be rearranged as needed. The method 900 ends after the last operation, via block 910.

The method 900 may be varied. In various examples, selection of the memory cells need not be made by selection of a contiguous row. Arranging data in the memory cells according to rows may simplify the selection process. For example, a single PE-relative memory address may be referenced (e.g., all PEs refer to their local memory cell with the same given address). That said, it is not strictly necessary to arrange the data in rows. In addition or alternatively, a new set of memory cells need not be selected for each operation. The same set may be used in two or more consecutive cycles. Further, overlapping sets may be used, in that a memory cell used in a former operation may be deselected and a previously unselected memory cell may be selected for a next operation, while another memory cell may remain selected for both operations. In addition or alternatively, the operands in the PE registers need not be rearranged each cycle. Operands may remain in the same arrangement for two or more consecutive cycles. Further, operand rearrangement does not require each operand to change location, in that a given operand may be moved while another operand may remain in place.

Figure 9:
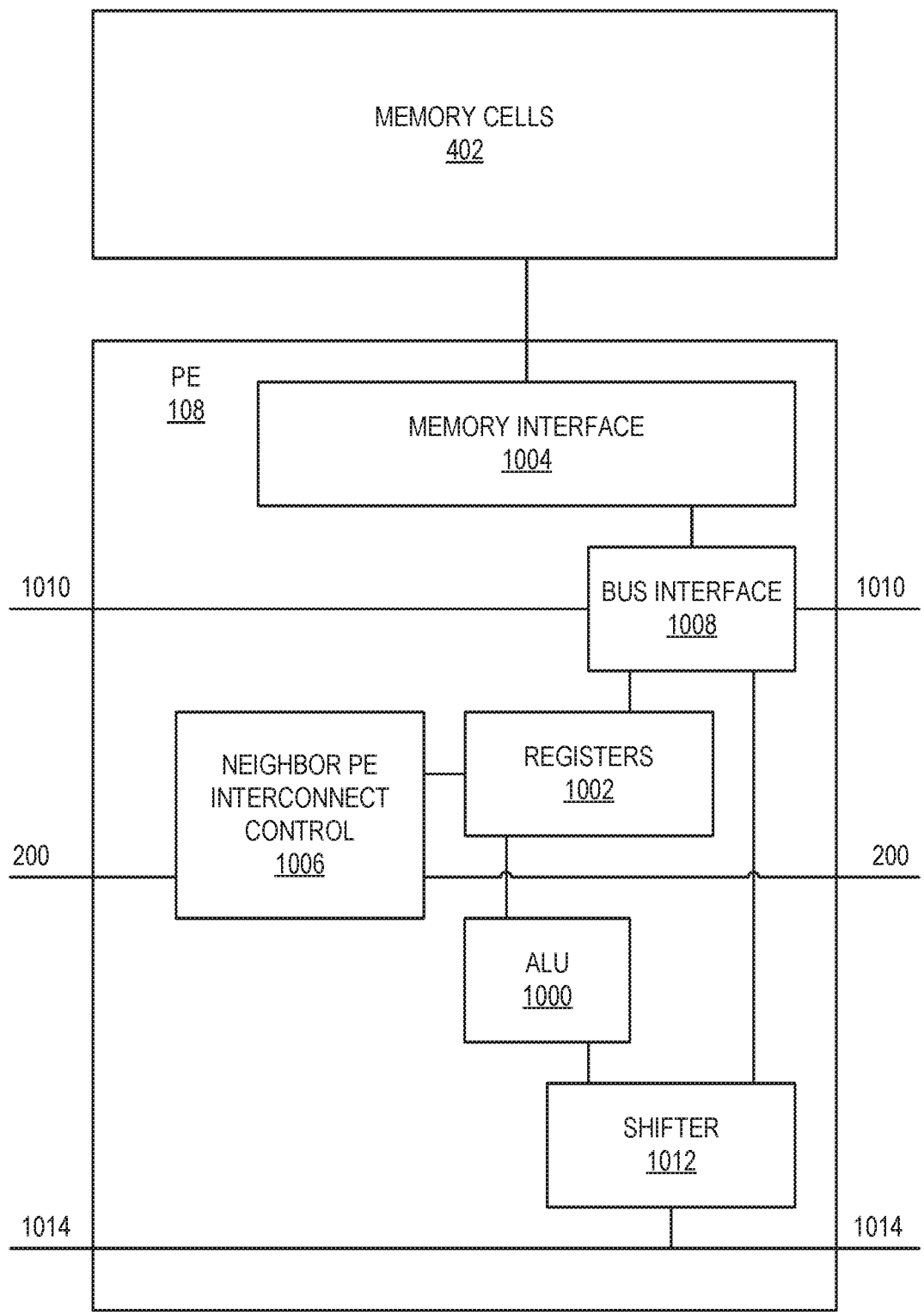
FIG. 9 is a block diagram of an example processing element and related memory cells.

FIG. 9 shows an example PE 108 schematically. The PE 108 includes an ALU 1000, registers 1002, a memory interface 1004, and neighbor PE interconnect control 1006.

The ALU 1000 performs the operational function of the PE. The ALU 1000 may include an adder, multiplier, accumulator, or similar. In various examples, the ALU 1000 is a multiplying accumulator. The ALU 1000 may be connected to the memory interface 1004, directly or indirectly, through the registers 1002 to share information with the memory cells 402. In this example, the ALU 1000 is connected to the memory interface 1004 though the registers 1002 and a bus interface 1008.

The registers 1002 are connected to the ALU 1000 and store data used by the PE 108. The registers 1002 may store operands, results, or other data related to operation of the ALU 1000, where such data may be obtained from or provided to the memory cells 402 or other PEs 108 via the neighbor PE interconnect control 1006. The registers 1002 may be termed computation registers.

The memory interface 1004 is connected to the memory cells 402 and allows for reading/writing at the memory cells 402 to communicate data with the registers 1002, ALU 1000, and/or other components of the PE 108.

The neighbor PE interconnect control 1006 connects to the registers 1002 and controls communication of data between the registers 1002 and like registers of neighboring PEs 108, for example via interconnections 200 (FIG. 2), and/or between a controller (see 106 in FIG. 3). The neighbor PE interconnect control 1006 may include a selector, such as a logic/switch array, to selectively communicate the registers 1002 to the registers 1002 of neighboring PEs 108, such as first, second, fourth, or sixth neighbor PEs. The neighbor PE interconnect control 1006 may designate a single neighbor PE 108 from which to obtain data. That is, the interconnections 200 may be restricted so that a PE 108 only at most listens to one selected neighbor PE 108. The neighbor PE interconnect control 1006 may connect PEs 108 that neighbor each other in the same row. Additionally or alternatively, a neighbor PE interconnect control 1006 may be provided to connect PEs 108 that neighbor each other in the same column.

The PE may further include a bus interface 1008 to connect the PE 108 to a bus 1010, such as a direct memory access bus. The bus interface 1008 may be positioned between the memory interface 1004 and registers 1002 and may selectively communicate data between the memory interface 1004 and either a component outside the PE 108 connected to the bus 1010 (e.g., a main processor via direct memory access) or the registers 1002. The bus interface 1008 may control whether the memory 402 is connected to the registers 1002 or the bus 1010.

The PE may further include a shifter circuit 1012 connected to the ALU 1000 and a wide-add bus 1014 to perform shifts to facilitate performing operations in conjunction with one or more neighbor PEs 108.

Figure 10:
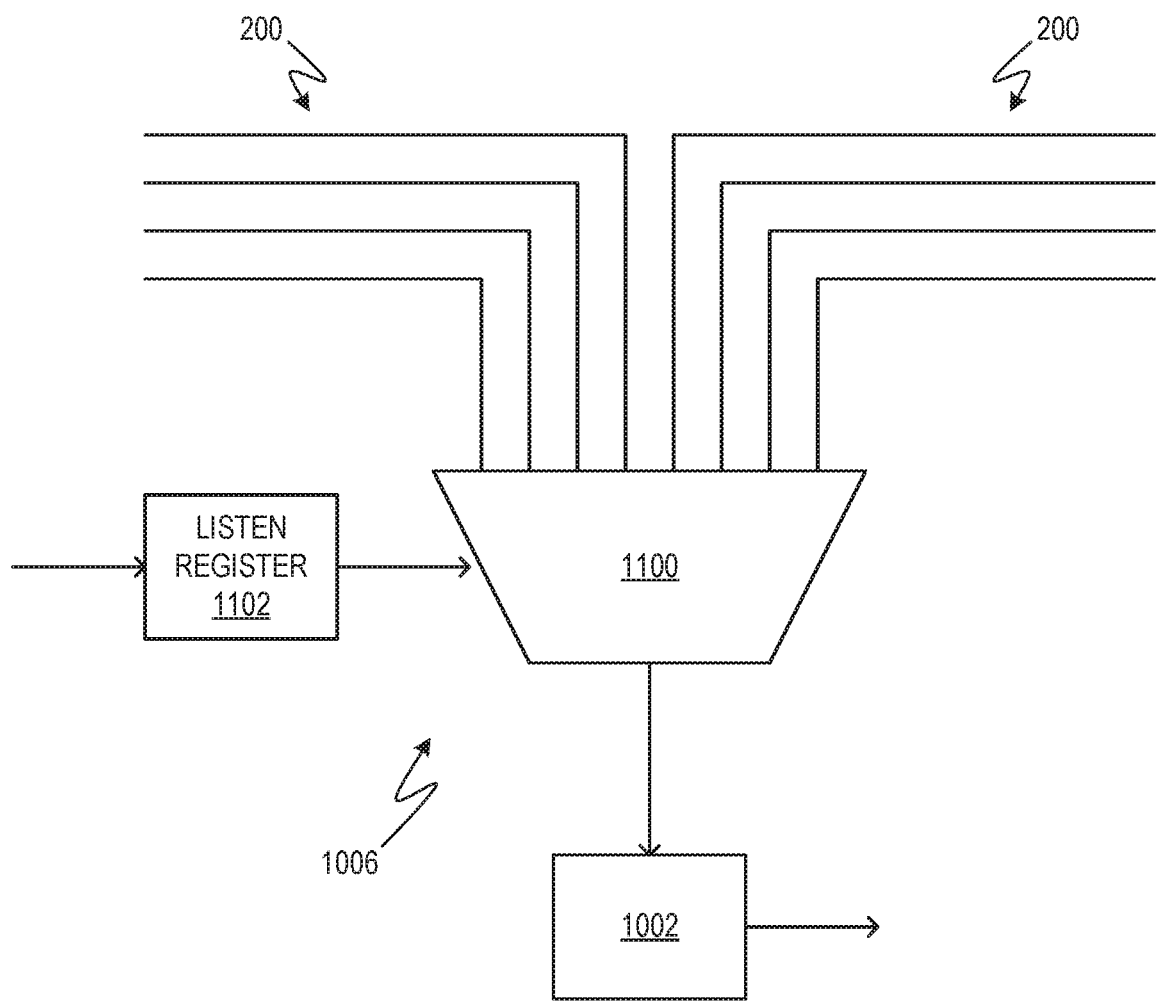
FIG. 10 is a block diagram of an example of the neighbor processing element interconnect control of FIG. 9.

FIG. 10 shows an example of the neighbor PE interconnect control 1006. The neighbor PE interconnect control 1006 includes a multiplexer 1100 and a listen register 1102 to act as a selector to provide input to the PE 108.

The multiplexer 1100 selectively communicates one interconnection 200 to a neighbor PE 108 to a register 1002 used for operations of the PE 108 to which the neighbor PE interconnect control 1006 belongs. Hence, a PE 108 listens to one neighbor PE 108.

The listen register 1102 controls the output of the multiplexer 1100, that is, the listen register 1102 selects a neighbor PE 108 as source of input to the PE 108. The listen register 1102 may be set by an external component, such as a controller 106 (FIG. 3), or by the PE 108 itself.

Figure 11:
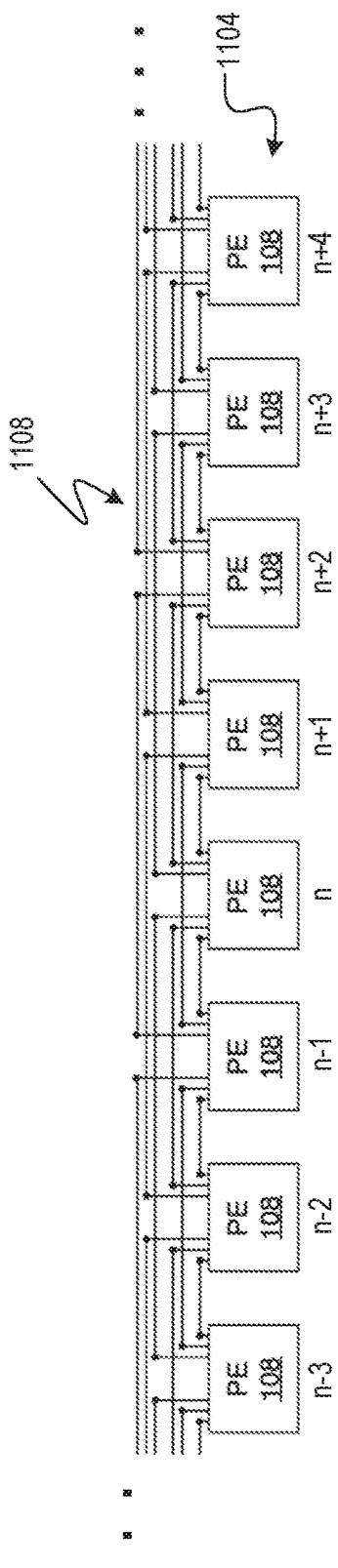
FIG. 11 is a block diagram of another example array of processing elements.

FIG. 11 shows another example row 1104 including an array of processing elements 108, which may be physically arranged in a linear pattern (e.g., a physical row). Each PE 108 includes an ALU to perform an operation, such as addition, multiplication, and so on.

The PEs 108 are mutually connected to share or communicate data. For example, interconnections 1108 may be provided among the array of PEs 108 to provide direct communication among neighboring PEs 108.

A given PE 108 (e.g., indicated at "n") is connected to a first neighbor PE 108 (i.e., n+1) that is immediately adjacent the PE 108. Likewise, the PE 108 (n) is further connected to a second neighbor PE 108 (n+2) that is immediately adjacent the first neighbor PE 108 (n+1) and to a third neighbor PE 108 (n+3) that is immediately adjacent the second neighbor PE 108 (n+2). The PE 108 (n) is also connected to opposite first (n−1), second (n−2), and third (n−3) neighbor PEs 108. Connecting each PE 108 to its first, second, and third neighbors allows for PEs 108 to communicate data locally and effectively (as discussed above) and further allows any PE 108 that may be defective or malfunctioning to be skipped.

Various PEs 108 may be connected to neighboring PEs 108 in the same relative manner. The designation of a PE 108 as "n" may be considered arbitrary for non-endmost PEs 108. PEs 108 at the ends of the array may omit certain connections by virtue of the array terminating. In the example of each PE 108 being connected to its first, second, third neighbor PEs 108 in both directions, the three endmost PEs 108 have differing connections. Endmost PEs 108 may connect to a controller.

Figure 12:
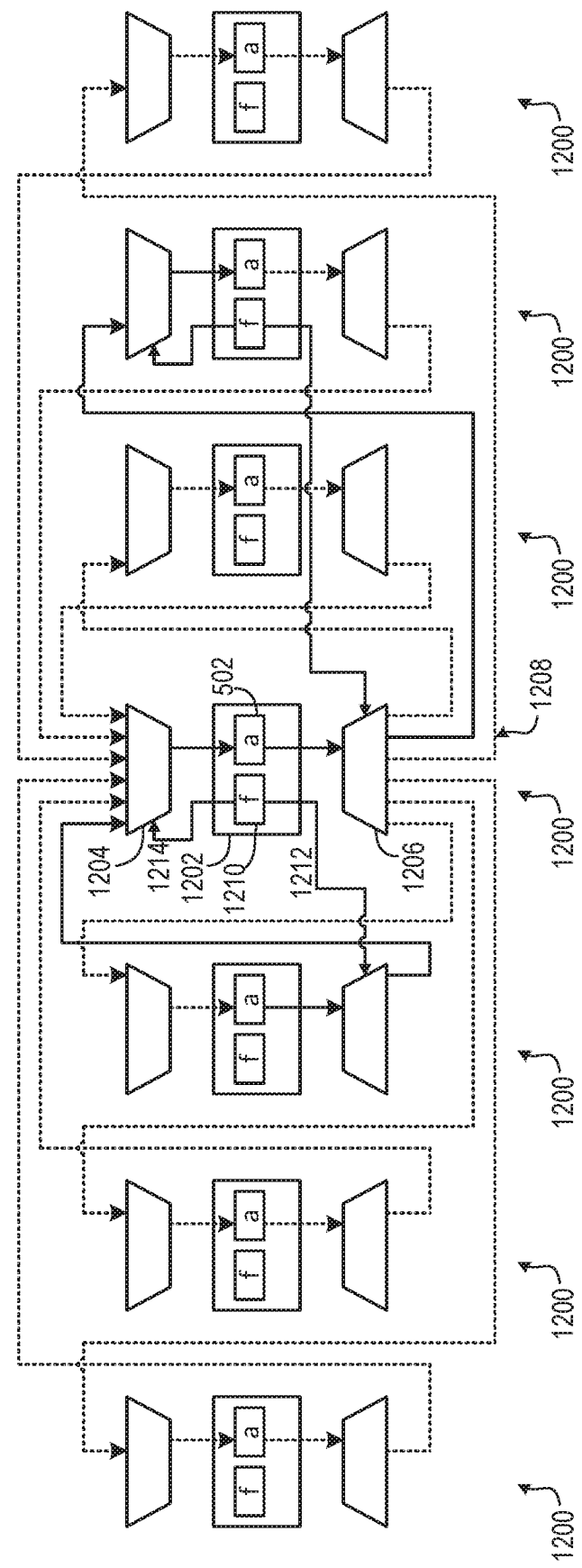
FIG. 12 is a block diagram of an example of the neighbor processing element selector.

FIG. 12 shows an array of PE units 1200 with an example neighbor PE interconnect control or selector circuit.

Each PE unit 1200 includes a PE 1202, an input selector 1204, and an output selector 1206. Memory for each PE 1200 is not shown for sake of clarity. The other PEs described herein may be referenced for detail omitted here.

For each PE unit 1200, the input selector 1204 is connected to the output selector 1206 of neighboring PE units 1200 via conductive lines 1208, such as the first, second, and third neighbor PE units 1200 in both directions. The input selector 1204 may include a multiplexer or arrangement of multiplexers. The output selector 1206 may include a logic-gate array.

For sake of clarity, not all connections are shown for all PE units 1200. The central PE unit 1200 and its connections can be taken as representative for the PE units 1200 in general. That is, each PD unit 1200 is connected to its neighbor PE units 1200 in the same manner as the central PE unit 1200 shown. In the example show, connections via conductive lines/traces shown in dashed line are inactive and those shown in solid line are active. However, it should be understood that any connection may be activated or inactivated, at various times for various reasons, as discussed herein.

Each PE 1202 includes a selector or "listen" register 1210 (also termed an "f" register) and registers 502 used for computations (also termed "a" registers for storing an input vector). The listen register 1210 of a given PE 1202 determines which neighboring PE 1202 is to be a source of data to the given PE 1202.

The listen register 1210 of the PE 1202 provides a selection input to the input selector 1204 of the PE 1202, as shown for example at 1214. The listen register 1210 can therefore select the input for the PE 1202 at the input selector 1204 from among the neighbor PEs connected to the input selector 1204. The PE 1202 may therefore "listen" to another PE 1202.

The listen register 1210 of the PE 1202 may also provide input to the output selector 1206 of neighboring PEs 1202. One such connection is shown at 1212. However, it should be understood that listen register 1210 connects to each neighboring PE's output selector 1206. The listen register 1210 controls the neighboring PE's output selector 1206 to connect to the input selector 1204. In the example shown, the central PE 1202 takes data from the PE 1202 immediately to its left, and hence the line connecting the neighboring output selector 1206 to the input selector 1204 is shown in solid line. Control of output at the output selector 1206 can save power in cases where the output of a particular PE 1202 is not being listened to by another PE 1202. The output selector 1206 can be useful in avoiding unnecessary signal transitions on conductive traces/lines connecting PEs 1202, where such signal transitions could otherwise trigger operation a multiplexer at the input selector 1204 and thereby needlessly consume power. If a signal is not listened to by another PE, then the output selector 1206 prevents output of the signal, so as to save power by avoiding unneeded triggering of logic in connected PE units 1200.

Also, shown in FIG. 12, the PE 1202 that is second from right has its listen register 1210 set such that the PE 1202 takes input from the central PE 1202, which is the second neighbor to the left.

Figure 13:
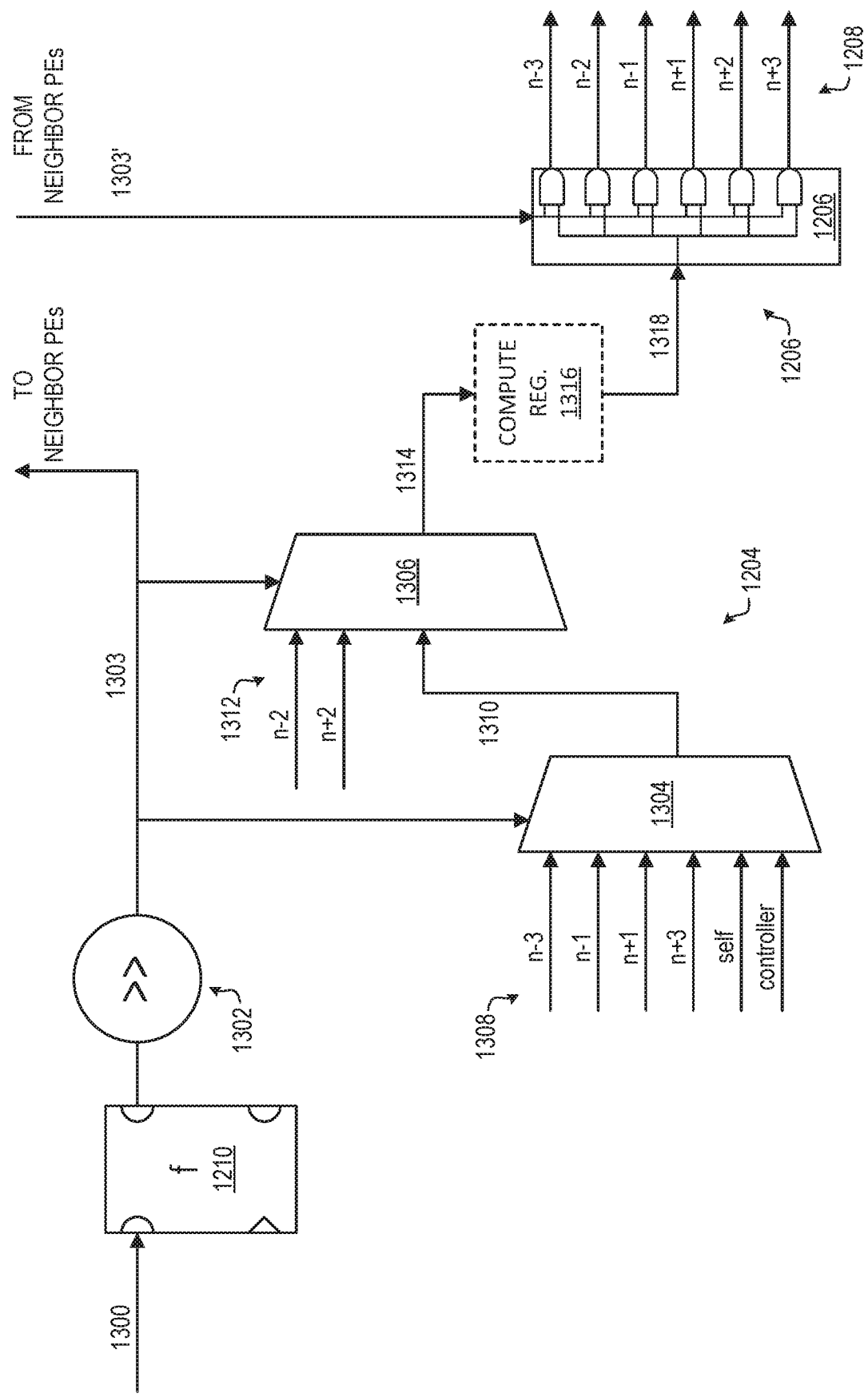
FIG. 13 is a schematic diagram of example input and output selectors.

FIG. 13 shows an example listen register 1210, input selector 1204, and output selector 1206 that may be provided to a PE, such as the PE 1202 of FIG. 12.

The listen register 1210 may include a flip-flop, latch, or similar component that takes input 1300 from a controller, such as the controller 106 of FIG. 2, or from the PE to which the listen register 1210 belongs. The input 1300 sets which neighboring PE is to provide data. When there are six possible PEs as sources of input (e.g., three adjacent in each of two directions), the input 1300 may be three bits and therefore capable of indicating at least six unique values (e.g., 0-7). The input 1300 may be controlled by instructions at a non-transitory machine-readable medium to control operation of a processing device or computing device to which the PE belongs.

A converter 1302 may be provided to convert the binary value outputted by the listen register 1210 to a one-hot output 1303. For example, output at the converter 1302 may be eight on/off lines.

The input selector 1204 may include an unbalanced multiplexer arrangement that include a first multiplexer 1304 and a second multiplexer 1306. Input 1308 to the first multiplexer 1304 may include the outputs from several neighboring PEs, such as the outputs from the first and third neighboring PEs in both directions (n−3, n−1, n+1, n+3). The output 1310 of the first multiplexer 1304 may be connected to the input of the second multiplexer 1306. The second multiplexer 1306 may also take as input 1312 the outputs from several neighboring PEs, such the second neighboring PEs in both directions (n−2, n+2). The second multiplexer 1306 may provide its output 1314 to computation registers 1316 of the PE, such as registers 500, 502, 1002, discussed elsewhere herein. For example, as is particularly relevant to the functionality provided by the listen register 1210, the input selector 1204, and the output selector 1206, the computation registers 1316 of the PE may store input vector components (activations, or "a" components). Additional computation registers 1316 may store result ("d") vector components and coefficients ("c").

Additional inputs may be provided to the unbalanced multiplexer arrangement as, for example, inputs 1308 to the first multiplexer 1304. For example, an additional input can provide the PE's own output as input to itself. A "self" or loopback input may be useful for iterative computations. Additionally or alternatively, an additional input can connect to a controller, such as the controller 106 of FIG. 3, so that the PE can receive data from the controller. This may be used to implement broadcast functionality, whereby a group of PEs are set to listen for data from the controller.

Selection inputs to the multiplexers 1304, 1306 can be appropriate lines of the one-hot signal 1303 obtained from the listen register 1210.

It has been found that communications among second neighbor PEs are more frequent than among other neighbors, such as first and third. As such, the unbalanced arrangement of multiplexer 1304, 1306 can save power due to the inputs 1312 of the downstream multiplexer 1306 being more active.

The output selector 1206 may include logic that provides output 1318 of the computation registers 1316 to a set of lines 1208 that provide output to neighboring PEs. For example, the output selector 1206 may provide AND logic for each line 1208, in which the inputs to the AND logic are the output 1318 of the computation registers 1316 and an appropriate line of a one-hot signal 1303' obtained from a neighboring PE. That is, a neighboring one-hot signal 1303' may be considered an enable signal that forwards the output 1318 of the computation registers 1316 to the selected line 1208. As such, the PE provides its one-hot signal 1303 to neighboring PEs so that it may receive corresponding neighbor signals at the arrangement of multiplexer 1304, 1306 and, at the same time, receives a one-hot signal 1303' from its neighbor PEs so that its output may be appropriately routed to the neighbor PEs requesting it.

As should be apparent from the above discussion, the techniques discussed herein are suitable for low-power neural-network computations and applications. Further, the techniques are capable of handling a large number of computations with flexibility and configurability.

It should be recognized that features and aspects of the various examples provided above can be combined into further examples that also fall within the scope of the present disclosure. In addition, the figures are not to scale and may have size and shape exaggerated for illustrative purposes.

What is claimed is:

1. A processing device comprising:
   an array of processing elements, each processing element including an arithmetic logic unit to perform an operation and an output selector;
   interconnections among the array of processing elements to provide direct communication among neighboring processing elements of the array of processing elements wherein:
   a processing element of the array of processing elements is connected to a first neighbor processing element that is immediately adjacent the processing element, wherein a first output selector of the first neighbor processing element is connected to an input of the processing element; and
   the processing element is further connected to a second neighbor processing element that is immediately adjacent the first neighbor processing element, wherein a second output selector of the second neighbor processing element is connected to the input of the processing element; and
   wherein a register of the processing element is settable to set the first output selector or the second output selector to provide a respective output to the input of the processing element.

2. The processing device of claim 1, wherein:
   the processing element is further connected to an opposite first neighbor processing element that is immediately adjacent the processing element on a side opposite the first neighbor processing element; and
   the processing element is further connected to an opposite second neighbor processing element that is immediately adjacent the opposite first neighbor processing element.

3. The processing device of claim 2, wherein the processing element is further connected to a third neighbor processing element that is immediately adjacent the second neighbor processing element.

4. The processing device of claim 3, wherein the processing element is further connected to an opposite third neighbor processing element that is immediately adjacent the opposite second neighbor processing element.

5. The processing device of claim 4, wherein each non-endmost processing element of the array of processing elements is connected to neighboring processing elements in a same relative manner as the processing element.

6. The processing device of claim 4, wherein the processing element includes an input selector to select input to the processing element as one of:
   the first neighbor processing element,
   the opposite first neighbor processing element,
   the second neighbor processing element,
   the opposite second neighbor processing element,
   the third neighbor processing element, and
   the opposite third neighbor processing element.

7. The processing device of claim 6, wherein the input selector comprises an unbalanced multiplexer arrangement.

8. The processing device of claim 1, wherein each processing element includes an input selector to select input to the processing element as a respective output of a respective output selector of one of the neighboring processing elements.

9. The processing device of claim 8, wherein the register controls both the setting of the output selector of a selected one of the neighboring processing elements and the setting of the input selector of the processing element.

10. The processing device of claim 1, further comprising:
    a controller connected to the array of processing elements, the controller to perform a rearrangement of data within the array of processing elements by controlling communication of the data through the interconnections among the array of processing elements.

11. The processing device of claim 10, further comprising:
    memory at the array of processing elements;
    wherein the controller is to control the array of processing elements to perform a single-instruction, multiple-data (SIMD) operation with data in the memory.

12. The processing device of claim 1, further comprising a plurality of the arrays of processing elements.

13. A computing device comprising a plurality of processing devices of claim 1 as an arrangement of banks.

14. A non-transitory machine-readable medium comprising executable instructions to:
load a matrix of coefficients into an array of processing elements as serialized coefficients;
load an input vector into the array of processing elements; and
perform an operation with the matrix of coefficients and the input vector by:
performing a parallel operation with the serialized coefficients in the array of processing elements and the input vector;
accumulating a result vector; and
rotating the input vector in the array of processing elements and repeating the performing of the parallel operation and the accumulating until the operation is complete, wherein rotating the input vector includes controlling an input selector at a processing element and controlling an output selector at a neighbor processing element to deliver an element of the input vector to the processing element; and
when the operation is complete, outputting the result vector.

15. A processing device comprising:
an array of processing elements, each processing element including an arithmetic logic unit to perform an operation;
interconnections among the array of processing elements to provide direct communication among neighboring processing elements of the array of processing elements wherein:
a processing element of the array of processing elements is connected to a neighbor processing element via an input selector of the processing element and an output selector of the neighbor processing element to selectively take output of the neighbor processing element as input to the processing element, wherein the input selector of the processing element and the output selector of the neighbor processing element are settable by a register of the processing element.

16. The processing device of claim 15, wherein the input selector includes an unbalanced multiplexer arrangement.

* * * * *